United States Patent
Pomplas

[11] 3,956,973
[45] May 18, 1976

[54] DIE CASTING MACHINE WITH PISTON POSITIONING CONTROL

[75] Inventor: Leonard J. Pomplas, Wickliffe, Ohio

[73] Assignee: Basic Aluminum Castings Company, Cleveland, Ohio

[22] Filed: Jan. 2, 1974

[21] Appl. No.: 429,485

Related U.S. Application Data

[63] Continuation of Ser. No. 270,675, July 11, 1972, abandoned, which is a continuation-in-part of Ser. No. 187,766, Oct. 8, 1971, abandoned.

[52] U.S. Cl. .................................. 92/5 R; 92/223; 92/248; 116/124 D
[51] Int. Cl.² ..................... F01B 25/26; F01B 31/12
[58] Field of Search ............. 91/1, 363 R; 340/195, 340/196, 199; 92/5 R, 5 L, 223, 248; 74/DIG. 4, DIG. 7; 116/124 A, 124 D

[56] References Cited
UNITED STATES PATENTS

| | | | |
|---|---|---|---|
| 1,195,546 | 8/1916 | Wrightson | 92/248 |
| 1,204,889 | 11/1916 | Lilly | 92/248 |
| 2,430,757 | 11/1947 | Conrad et al. | 340/196 X |
| 3,004,336 | 10/1961 | Timuska | 92/223 X |
| 3,095,785 | 7/1963 | Cahill | 92/5 R X |
| 3,176,241 | 3/1965 | Hogan et al. | 340/196 X |
| 3,203,321 | 8/1965 | Rosen | 92/223 |
| 3,212,411 | 10/1965 | Storms | 92/248 |
| 3,218,591 | 11/1965 | Caruthers | 340/196 X |
| 3,231,882 | 1/1966 | De Neergaard | 340/196 X |
| 3,242,472 | 3/1966 | Anthony | 340/196 |
| 3,641,535 | 2/1972 | Knopf | 340/195 |
| 3,649,450 | 3/1972 | Barton | 340/196 X |
| 3,654,549 | 4/1972 | Maurer et al. | 340/195 X |

FOREIGN PATENTS OR APPLICATIONS

| | | | |
|---|---|---|---|
| 491,974 | 9/1938 | United Kingdom | 92/223 |

Primary Examiner—Martin P. Schwadron
Assistant Examiner—Abraham Hershkovitz
Attorney, Agent, or Firm—David A. Burge

[57] ABSTRACT

A die casting machine has a piston rod connected to its main ram for positioning the ram as the piston rod extends and retracts from a cylinder. A control system is provided which directly senses the position, velocity and acceleration of the piston rod. A smooth continguous outer surface is formed on the piston rod. Magnetic and non-magnetic materials spaced alternately axially along the rod provide a series of magnetic discontinuity fields along the piston rod. Transducers are provided to sense the magnetic discontinuities as the piston rod moves to provide signals indicative of the position, velocity and acceleration of the piston rod. An electrohydraulic servo valve is electrically connected to the transducers and to a control console for moving the piston rod and for recording its position, velocity, and acceleration.

10 Claims, 8 Drawing Figures

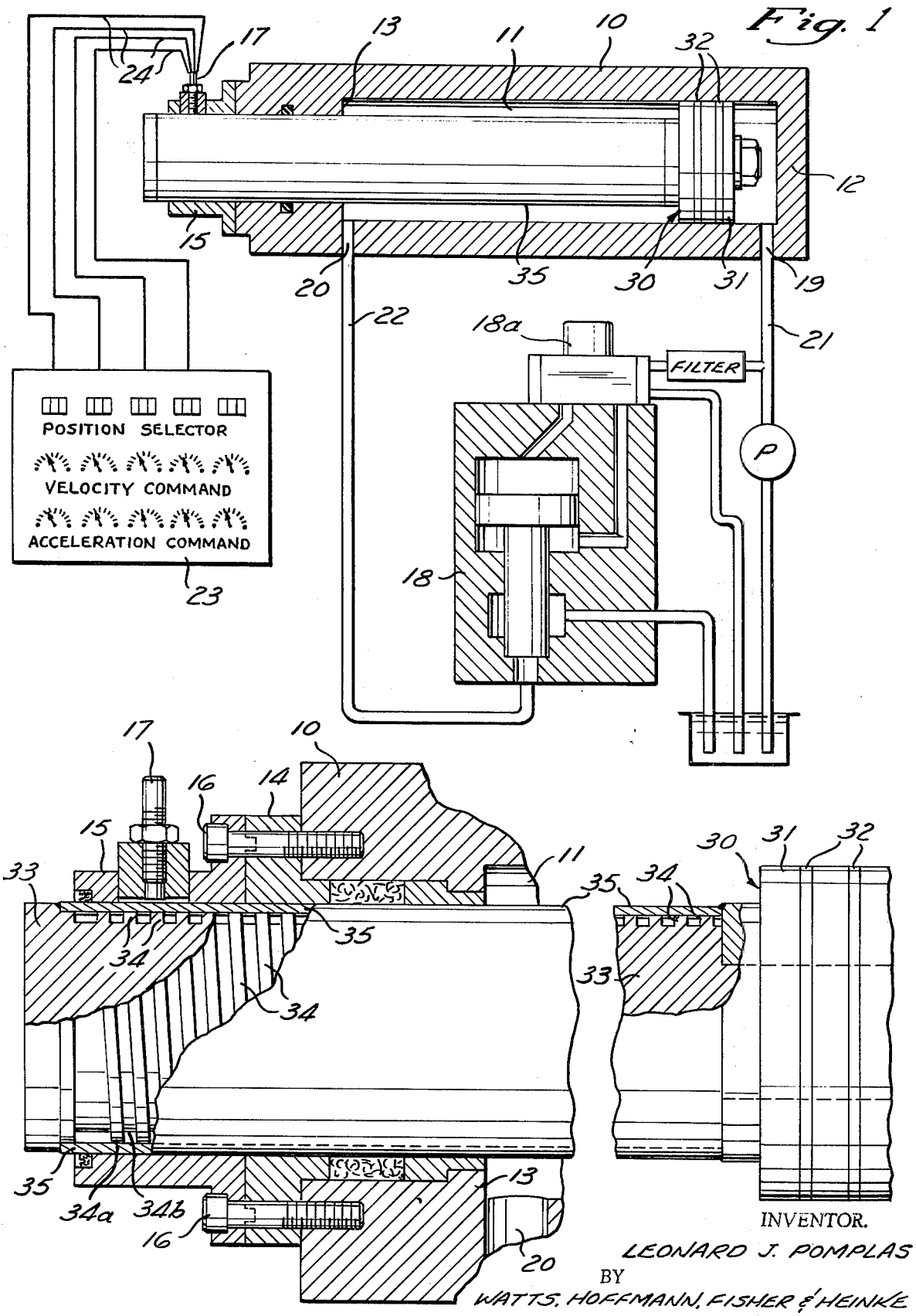

INVENTOR.
LEONARD J. POMPLAS
BY
WATTS, HOFFMANN, FISHER & HEINKE

ATTORNEYS

DIE CASTING MACHINE WITH PISTON POSITIONING CONTROL

CROSS REFERENCE TO RELATED APPLICATION

This application is a continuation of application Ser. No. 270,675, filed July 11, 1972 now abandoned as a continuation-in-part of application Ser. No. 187,766, filed Oct. 8, 1971 now abandoned.

BACKGROUND OF THE INVENTION

1. Field of the Invention

This invention relates to positioning and monitoring of the position, velocity and acceleration of a reciprocating piston, and more particularly to the controlled position of the ram of a die casting machine.

2. Description of the Prior Art

In die casting it is known to use a reciprocating piston to move the main ram of a die casting machine. The use of some automatic controls in a die casting machine is also known.

A disadvantage of prior die casting machines is that they do not directly sense the position, velocity, and acceleration of the piston rod which positions the main ram.

A problem in die casting apparatus is a need for a variable speed control system to reciprocate the piston rod connected to the main ram to move the ram in accordance with preselected position, velocity, and acceleration profiles. Prior die casting machines do not provide this control capability.

SUMMARY OF THE INVENTION

The present invention overcomes the foregoing and other drawbacks of the prior art.

A piston rod which moves the main ram of a die casting machine has a smooth outer surface. Alternately axially spaced magnetic and non-magnetic materials are provided along the piston rod to form magnetic discontinuities.

A transducer system is provided to sense the magnetic discontinuity of the piston rod and to provide signals indicative of the position, velocity, and acceleration of the reciprocating piston rod. The signals are transmitted to a recording console and to a servo valve unit. The servo valve unit supplies pressurized fluid to move the piston rod. An important advantage of the invention is that sensing information is taken directly from the moving part whose position is critical to the die casting operation, i.e. the piston rod connected to the main ram of the die casting machine. Another advantage is a resulting improvement in the quantity and quality of products produced by die casting machines embodying the invention. Still another advantage is the ability to accurately repeat work cycles having specific ram position, velocity and acceleration profiles regardless of changes of load pressures differences of oil viscosity, temperature differences and changes in plunger resistance.

Other advantages and a fuller understanding of the invention may be had by referring to the following description of the preferred embodiments as applied illustratively to a die casting machine, taken in conjunction with the accompanying drawings.

BRIEF DESCRIPTION OF THE DRAWINGS

The invention is illustrated in the drawings in which conventional parts are omitted or merely indicated to clarify the specification.

FIG. 1 is a schematic view, partly in section, showing a cylinder and piston employed in a die casting machine in combination with a recording console, a control valve and a servo valve;

FIG. 2 is an enlarged side elevational view, partly in section, of one embodiment of the piston and cylinder of FIG. 1;

DESCRIPTION OF THE PREFERRED EMBODIMENTS

Figure 3:
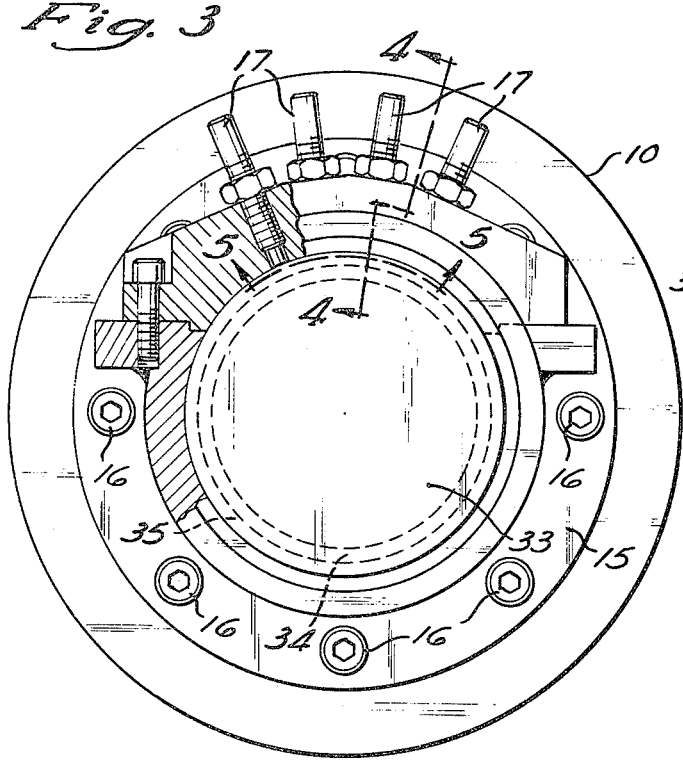
FIG. 3 is an enlarged end elevational view of the piston and cylinder of FIG. 2, the view being partly in section.
Figure 4:
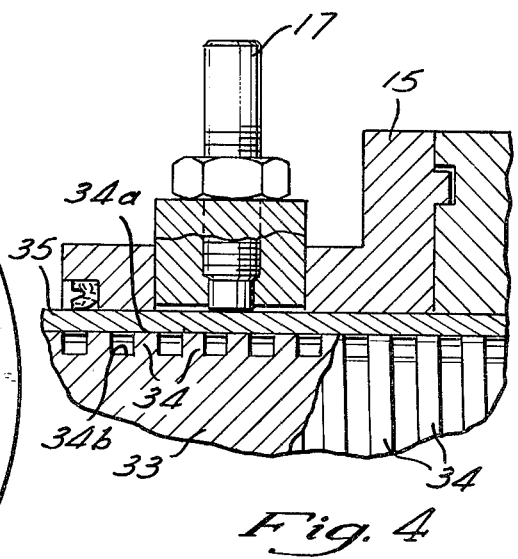
FIG. 4 is an enlarged sectional view as seen from the broken plane indicated by a line 4—4 in FIG. 3.
Figure 6:
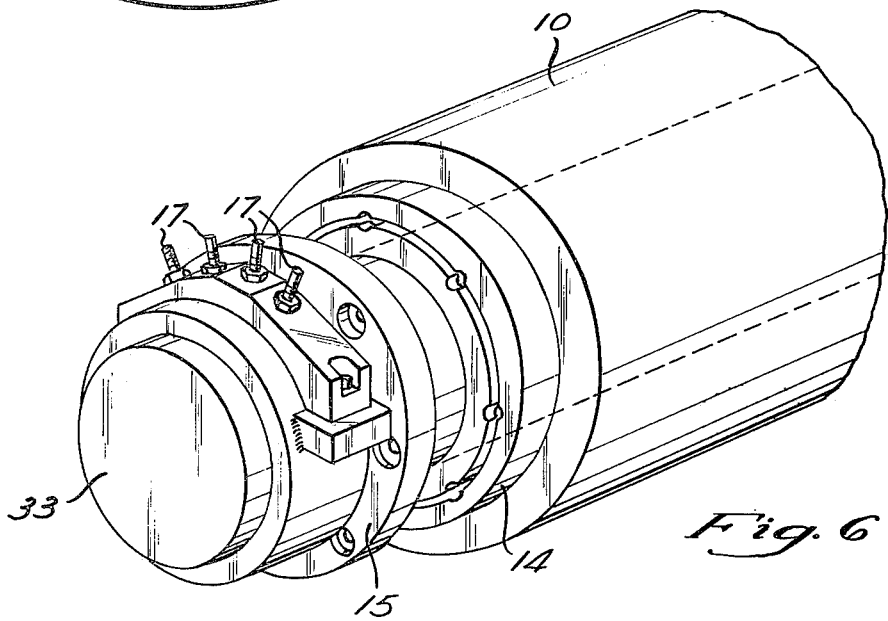
FIG. 6 is a perspective view of the open end of the cylinder and piston of FIG. 1 showing transducers mounted on a packing gland retainer.

A cylinder and reciprocating piston as used in a die casting machine, together with an electronic control recording console, a servo valve, and a speed control valve is illustrated in FIG. 1. The die casting machine (not shown) may be of any suitable structure such as shown in U.S. Pat. No. 2,636,233. The electrohydraulic servo valve unit, the speed control valve and the electronic recording console are not a part of the invention but are shown in the drawing to facilitate an understanding of the invention. The cylinder and reciprocating piston of the present invention may be mounted on the die casting machine shown in U.S. Pat. No. 2,636,233 as a substitute for the cylinder and piston shown therein.

Referring to FIGS. 1–5, a cylinder member includes a metallic cylinder body 10. A cylindrical piston-receiving chamber 11 is defined in body 10. An end wall 12 closes one end of the chamber 11. The other end of the chamber 11 is open as indicated by the numeral 13. A packing gland 14 is positioned adjacent the open end 13 of said chamber 11. A packing gland retainer 15 is positioned adjacent said gland 14 and is secured to the body 10 by suitable fasteners such as cap screws 16. Transducer units 17 are mounted on the packing gland retainer 15.

A metallic piston 30 is positioned in the cylinder chamber 11. The piston 30 includes an enlarged piston head 31. Piston rings 32 are provided on the piston head 31. A piston rod 33 is connected to the piston head 31 and extends through the packing gland retainer 15.

In the embodiment of FIGS. 1–5, threads 34 are formed on the piston rod 33. The threads 34 extend axially along at least the area of the piston rod 33 which passes the transducer units 17 during a full operational stroke of piston 30 and its rod 33. A nonmagnetic metallic sleeve casing 35 is shrink fitted on the piston rod 33 and engages the peripheral surface of the piston rod 33.

FIG. 1 shows a schematic view of a speed control valve 18. An electrohydraulic servo valve unit 18a of any suitable type is mounted on the control valve 18 to control the valve 18.

The cylinder body 10 has an aperture 19 near the end wall 12 and a second aperture 20 near the open end 13. Both of the apertures 19, 20 communicate with the chamber 11. The aperture 19 is adapted to receive a fluid supply pipe 21 carrying hydraulic fluid under pressure from a hydraulic fluid pressure system. As such pressurized fluid is supplied to the chamber 11, it actuates the piston 30 to effect a forward stroke. The aperture 20 is adapted to receive a fluid discharge pipe 22 carrying fluid under pressure from the chamber 11 during the forward stroke of the piston 30. The pipe 22 delivers such fluid to the speed control valve 18. The rate of fluid discharge through the valve 18 is controlled by the servo valve unit 18a.

FIG. 1 also shows a schematic view of an electronic data recording console 23. Electric wires 24 extend from the console 23 to each of four transducer units 17. The wires 24 transmit electrical signals from the transducer units 17 to the console 23.

In the embodiment disclosed, in FIGS. 1–5, piston rod 33 has a square thread 34 with a flat top 34a and a flat bottom 34b. It has been found that such a thread having a width of 0.200 inches and a depth of 0.200 inches and a pitch of 2.0 to 2.5 is satisfactory.

The thread top 34a is in contact with a inner surface of the nonmagnetic sleeve casing 35. a sleeve casing 35 having a wall thickness of approximately 3/16 of an inch allows the magnetic that influence of the thread tops 34a to be sensed through the sleeve casing 35 by the transducer units 17 as the thread tops 34a pass by the transducers 17 during movement of the piston rod 33.

When the thread bottoms 34b pass by the transducer units 17, the added distance provided by the depth of the threads 34 reduces the intensity of the sensed magnetic field.

As the piston rod 33 moves, the magnetic influence of the thread tops 34a is sensed by the transducer units 17 and the transducer units 17 create pulsed signals. These signals are electrically transmitted through the wires 24 to the console 23. A conventional magnetic pick up head has been found to be satisfactory for the transducers 17. The signals from the transducers are used to provide data relating to the position, velocity, and acceleration of the piston rod 33. This data is used to formulate a control signal that is electrically transmitted to the servo valve 18a. The servo valve 18a controls the hydraulic fluid pressure within the cylinder chamber 11 to position the piston rod 33.

Figure 5:
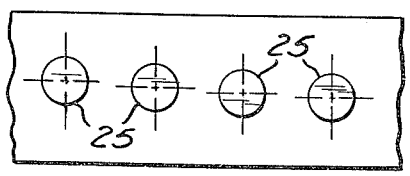
FIG. 5 is a diagrammatic layout of the centerlines for the placement of each of the transducers shown in FIG. 3.

FIG. 5 shows the preferred arrangement of the centers of location 25 of the transducer units 17. The centers 25 are offset along the path of travel of the piston rod 33 to provide a successive sequence of signals transmitted by the transducer units 17 to said console 23. The transducer units 17 may be positioned at predetermined spacings in accordance with the pitch of the thread 34 and the frequency of the signals desired. It has been found that with four transducer units 17 satisfactory results can be had with a spacing of 16° between radial centers and with an axial offset of 0.032 inch between adjacent transducers.

Instead of providing the piston rod 33, with threads, the piston rod 33 may be constructed with uniformly axially spaced grooves, slots, or notches which will perform the function of the threads 34.

The piston rod 33 may be made of nonmagnetic material with its threads, grooves, or slots, notches being filled with magnetic material to perform the function of the described threads 34.

Figure 7:
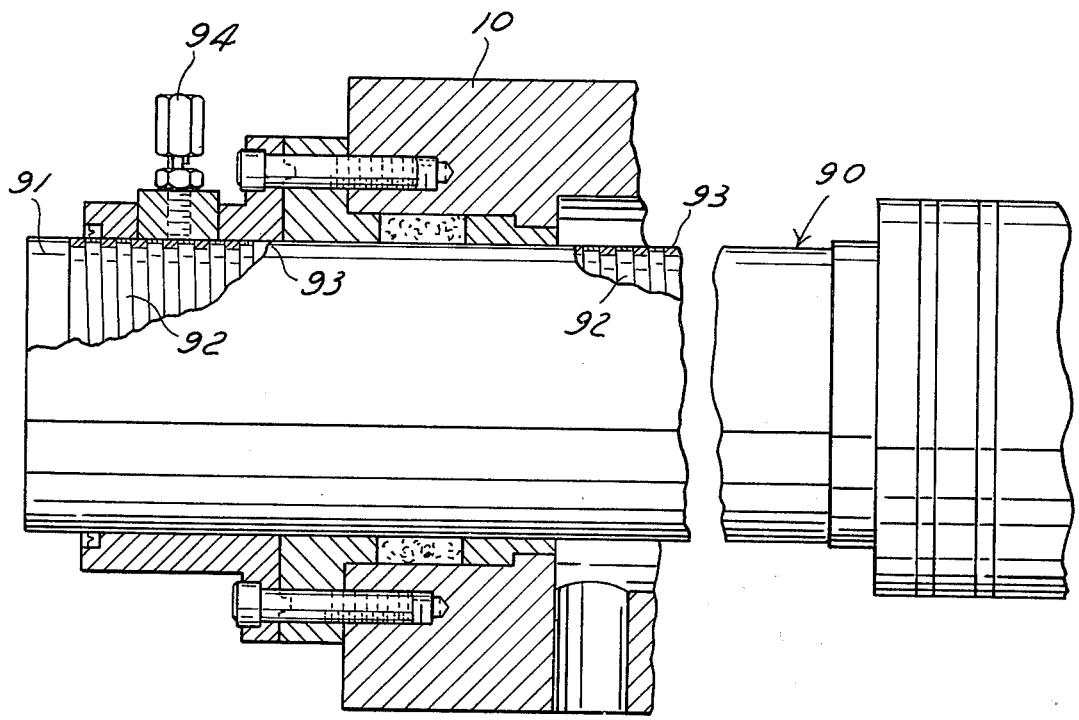
FIG. 7 is a view of a cylinder and piston forming the preferred embodiment of the present invention.
Figure 8:
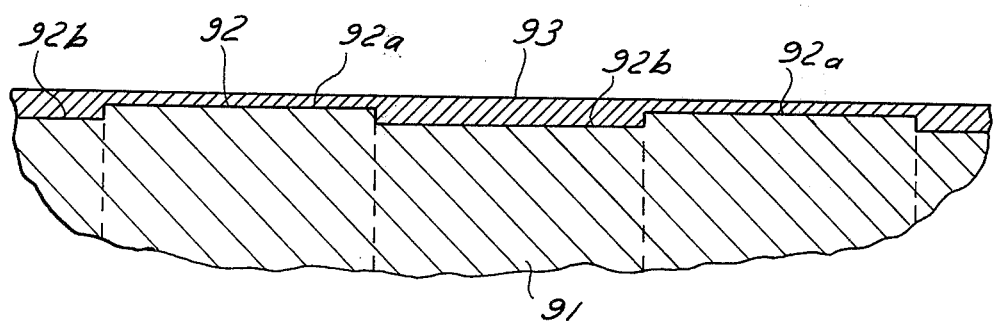
FIG. 8 is an enlarged sectional view of FIG. 7 showing the preferred embodiment of the piston rod.

FIGS. 7 and 8 show the preferred embodiment of the invention that resembles, in many respects, the piston and magnetic threaded piston rod and nonmagnetic casing as shown in FIGS. 2 and 3 but differs therefrom in that the thread depth of the piston rod is reduced and that the nonmagnetic metal casing covering said piston rod is electrodeposited thereon.

Referring to FIGS. 7 and 8, a piston 90 is slidably movable in a cylinder 10. A piston rod 91 is connected to the piston 90 and is slidably mounted in the cylinder body 10. The piston rod 91 has helical thread 92 preferably of the square type with a flat top 92a and a flat bottom 92b similar to the thread 34. It has been found that a thread having a width of 0.200 inches and a depth of 0.005 inches and a pitch of from 2.0 to 2.5 is satisfactory.

The piston rod 91 has a nonmagnetic metal casing 93 that is electrodeposited on the surface of the thread area 92. The electrodeposited coating 93 fills the thread valleys. A preferred thickness of the coating 93 is 0.003 inches over the whole outside diameter of the piston rod 91. A hard chrome electrodeposition or plating is preferably used to form the casing 93.

A transducer 94 similar to the transducer units 17 is used to provide signals to the recording console 23. The transducer 94 is mounted on a packing gland retainer 15. A transducer 94 is of the known zero velocity digital type magnetic pickup unit. The transducer 94 has its pickup head positioned within 0.012 inches of the thread tops 92a for satisfactory signal results.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A cylinder and reciprocating piston combination, comprising:
   a. a cylinder body defining a chamber and having an open end;
   b. a piston movable in said chamber in response to a supply of pressurized fluid to said chamber;
   c. a piston rod connected to said piston for movement therewith relative to said body and extending through said open end;
   d. said piston rod being formed from a first magnetic material having a peripheral surface including a plurality of axially spaced groove portions said peripheral surface and said groove portions being covered by a second non-magnetic material which provides a smooth outer wear surface for said piston rod;

e. packing means carried by said body and forming a seal circumferential of said wear surface to inhibit the escape of pressurized fluid through said open end; and f. transducer means positioned near said wear surface, said first and second materials cooperating to define a magnetic discontinuity means for cooperating with said transducer means to produce electrical pulse signals for indicating the passage past said transducer means of one of the groove portions in said peripheral surface.

2. The apparatus of claim 1 wherein said second material fills the groove portions in said peripheral surface.

3. The apparatus of claim 1 wherein said first material is a ferrous metal and said second material is a substantially non-ferrous metal.

4. The apparatus of claim 3 wherein said second material is a chrome coating.

5. The apparatus of claim 1 wherein threads form said groove portions.

6. The apparatus of claim 1 wherein said second material extends at least partially into the groove portions.

7. The apparatus of claim 1 wherein said transducer means includes at least two transducer units mounted at axially spaced positions along the path of movement of said piston rod to provide successive variations in electrical signals when said piston rod moves relative to said transducer units.

8. A cylinder and reciprocating piston combination, comprising:

a. a cylinder body defining a chamber and having an open end;

b. a piston movable in said chamber in response to a supply of pressurized fluid to said chamber;

c. a piston rod connected to said piston for movement therewith relative to said body and extending through said open end;

d. said piston rod having a substantially cylindrical core formed from a ferrous metal having a circumferentially grooved peripheral surface, said peripheral surface being covered by a substantially non-ferrous metal coating which extends at least part way into the grooves of said peripheral surface and which extends across peripheral core portions between such grooves to define a smooth, substantially cylindrical outer wear surface extending coaxially of said core;

e. packing means carried by said body and forming a seal circumferential of said wear surface to inhibit the escape of pressurized fluid through said open end; and f. transducer means positioned near said wear surface, said ferrous metal core and said non-ferrous metal coating cooperating to define a magnetic discontinuity means for cooperating with said transducer means for providing a variation in an electrical signal indicative of the passage past said transducer means of one of the grooves in said peripheral surface.

9. The apparatus of claim 8 wherein said non-ferrous metal is chrome.

10. The apparatus of claim 8 wherein threads form said grooved peripheral surface.

* * * * *